United States Patent [19]

Ramlow et al.

[11] Patent Number: 4,689,354

[45] Date of Patent: * Aug. 25, 1987

[54] PROCESS FOR THE PREPARATION OF WHITE GRAFT POLYMER DISPERSIONS AND FLAME-RETARDANT POLYURETHANE FOAMS

[75] Inventors: Gerhard G. Ramlow, Quebec, Canada; Duane A. Heyman, Monroe, Mich.; Oscar M. Grace, Troy, Mich.; Curtis J. Reichel, Wyandotte, Mich.; Robert J. Hartman, Southgate, Mich.

[73] Assignee: BASF Corporation, Parsippany, N.J.

[*] Notice: The portion of the term of this patent subsequent to Jun. 12, 2001 has been disclaimed.

[21] Appl. No.: 790,435

[22] Filed: Oct. 23, 1985

Related U.S. Application Data

[63] Continuation-in-part of Ser. No. 426,311, Sep. 29, 1982, Pat. No. 4,550,194, which is a continuation-in-part of Ser. No. 364,336, Apr., 1982, Pat. No. 4,454,255.

[51] Int. Cl.$^4$ .......................... C08K 5/06; C08K 5/10; C08L 29/02; C08L 51/08
[52] U.S. Cl. .................................. 521/137; 525/41; 525/43; 525/450
[58] Field of Search ................... 521/137; 525/41, 43, 525/450

[56] References Cited

U.S. PATENT DOCUMENTS

| | | | |
|---|---|---|---|
| 3,823,201 | 7/1974 | Pizzini et al. | 524/762 |
| 3,850,861 | 11/1974 | Fabris et al. | 521/170 |
| 3,950,317 | 4/1976 | Patton, Jr. et al. | 526/78 |
| 3,953,393 | 4/1976 | Ramlow et al. | 525/41 |
| 4,140,667 | 2/1979 | Preston et al. | 524/762 |
| 4,161,468 | 7/1979 | Davis et al. | 524/751 |
| 4,202,956 | 5/1980 | Taylor | 528/75 |
| 4,242,249 | 12/1980 | Van Cleve et al. | 524/769 |
| 4,273,881 | 6/1981 | Otten | 521/108 |
| 4,280,979 | 7/1981 | Dunleavy et al. | 264/157 |
| 4,286,074 | 8/1981 | Davis et al. | 521/137 |
| 4,390,645 | 6/1983 | Hoffman et al. | 521/137 |
| 4,454,255 | 6/1984 | Ramlow et al. | 521/137 |
| 4,460,715 | 7/1984 | Hoffman et al. | 521/137 |

Primary Examiner—John Kight
Assistant Examiner—M. L. Moore
Attorney, Agent, or Firm—Norbert M. Lisicki

[57] ABSTRACT

White graft polymer dispersions in polyoxyalkylene polyether polyols are employed together with flame retardant compounds to prepare flame retardant polyurethane foams. The polymer dispersions employ less than 0.1 mole of induced unsaturation per mole of polyol mixture. Improved processes for the preparation of these polymer dispersions employ either maleate or fumarate derived polyetherester polyols or polyetherester polyols prepared by reacting a polyoxyalkylene polyether polyol in the presence of a chain transfer agent with a compound selected from the group consisting of maleic acid, maleic anhydride and fumaric acid and an alkyklene oxide in the presence of salts and oxides of divalent metals.

29 Claims, No Drawings

PROCESS FOR THE PREPARATION OF WHITE GRAFT POLYMER DISPERSIONS AND FLAME-RETARDANT POLYURETHANE FOAMS

BACKGROUND OF THE INVENTION

This application is a continuation-in-part of Ser. No. 426,311. filed Sept. 29, 1982, now U.S. Pat. No. 4,550,194, which is a continuation-in-part of Ser. No. 364,336 filed Apr. 1, 1982, now U.S. Pat. No. 4,454,255.

1. Field of the Invention

The present invention relates to low viscosity white graft polymer dispersions in polyoxyalkylene polyether polyols and flame retardant polyurethane foams prepared therefrom. More particularly, the invention relates to graft polymer dispersions prepared by the improved process employing free radical polymerization of an ethylenically unsaturated monomer or mixture of monomers in a polyol mixture containing less than 0.1 mole of induced unsaturation per mole of polyol mixture. This improved process yields stable, not settling dispersions with graft polymer contents of 30 percent by weight and higher employing monomer mixtures which contain more than about 55 percent by weight styrene as the comonomer. Further, the invention relates to an improved process employing free radical polymerization in a polyetherester polyol-polyoxyalkylene polyether polyol mixture containing less than 0.1 mole of induced unsaturation per mole of polyol mixture wherein the unsaturated moiety is an isomerized maleate containing polyetherester polyol. Even more particularly the invention relates to an improved process employing free radical polymerization in a polyol mixture containing polyetherester polyol-polyoxyalkylene polyether polyol mixture which was prepared by reacting a polyoxyalkylene polyether polyol, a polycarboxylic acid anhydride and an alkylene oxide in the presence of an effective amount of a catalyst selected from the group consisting of salts and oxides of divalent metals.

2. Description of the Prior Art

The prior art, as evidenced by U.S. Pat. Nos. 3,652,658; 3,875,258; 3,950,317. and Reissue Pat. Nos. 28,715 and 29,014 teaches the preparation of graft polymer dispersions which are useful in the preparation of polyurethanes by the polymerization of ethylenically unsaturated monomers in the presence of polyols. The above patents disclose various methods of preparing graft polymer dispersions. U.S. Pat. No. 3,931,092 teaches the preparation of polymeric solids by polymerizing in the presence of a free-radical initiator, an organic solvent and high unsaturation levels. The solvent concentration employed is from about 1 part to 19 parts by weight per part of the hydroxy-terminated organic compound which has a polymerizable carbon double bond. U.S. Pat. No. 3,953,393 teaches the preparation of graft copolymer dispersions by employing alkylmercaptan chain transferring agents at concentrations from 0.1 to 2 percent by weight based on the weight of vinyl monomer. U.S. Pat. Nos. 4,390,645 and 4,460,715 teach the preparation of copolymer dispersions by the polymerization of ethylenically unsaturated monomers with adducts of an active hydrogen compound e.g. a polyether polyol with either an acrylyl compound or an ethylenically unsaturated isocyanate.

Stable dispersions of polymers in polyols have found broad commercial use in the preparation of polyurethanes. The use of these dispersions, known in the trade as graft or polymer polyols, improves processing and, among other properties, the firmness of the polyurethane products, often expressed as load bearing or modulus. There have been many attempts to improve the products representing the present state of the art. Efforts have been directed towards increasing the amount of polymer which is dispersed in the polyol, the obvious benefit being that firmer polyurethanes can be produced. Two major obstacles have been found: the viscosities of the resulting dispersions were too high and/or relatively high levels of acrylonitrile had to be used in the monomer mixtures employed.

The use of high levels ($\geq 50$ percent by weight) of acrylonitrile and, correspondingly, relatively low levels of the most common comonomer, styrene ($\leq 50$ percent) had two very undesirable effects. The resulting dispersions are tan to brown in color with a strong tendency to turn even darker in color during the highly exothermic polyurethane foam formation giving, for example, slab foams with a strong tendency to scorch. But even more undesirable, polyurethane foams made from these products cannot be satisfactorily flame retarded to pass flammability tests which are standard in the industry.

As mentioned before, there have been attempts to prepare high polymer ($\geq 30$ percent) containing dispersions with acceptable viscosities. These products contain ratios of acrylonitrile to styrene of $>50/50$ and are tan colored. None of the prior art teaches that polymer dispersions in unsaturated polyols containing less than 0.1 mole of induced unsaturation per mole of polyol mixture may be employed for flame-retardant polyurethane foams. Neither has the prior art taught that in situ free radical polymerizations may be conducted in a polyetherester polyol-polyoxyalkylene polyether polyol mixture containing less than 0.1 mole of induced unsaturation per mole of polyol mixture wherein the unsaturated moiety is an isomerized maleate containing polyetherester polyol. Also, the prior art is silent on the preparation of polyetherester polyols, by the reaction of a polyoxyalkylene polyether polyol, a polycarboxylic acid anhydride, and an alkylene oxide, in the presence of a catalyst selected from the group consisting of salts and oxides of divalent metals.

SUMMARY OF THE INVENTION

It has been discovered that flame-retardant polyurethane foams may be prepared by employing graft polymer dispersions. These dispersions are prepared by an improved process employing free radical polymerization of ethylenically unsaturated monomer or monomers in a polyol mixture containing less than 0.1 mole of induced unsaturation per mole of polyol mixture. Furthermore, it has been found that improved dispersions may be prepared by employing radical polymerization in a polyetherester polyol-polyoxyalkylene polyether polyol mixture containing less than 0.1 mole of induced unsaturation per mole of polyol mixture wherein the unsaturation moiety is an isomerized maleate containing polyetherester polyol. Still furthermore, it has been found that improved dispersions may be prepared by conducting the free radical polymerization in the presence of a polyetherester polyol which was prepared by reacting a polyether polyol, a polycarboxylic acid anhydride, and an alkylene oxide in the presence of an effective amount of a catalyst selected from the group consisting of salts and oxides of divalent metals.

DESCRIPTION OF THE PREFERRED EMBODIMENTS

In accordance with the improved process for the preparation of white graft polymer dispersions which are employed for the preparation of flame-retardant polyurethane foams, the improvement comprises conducting the polymerization of an ethylenically unsaturated monomer or mixtures of monomers in the presence of an effective amount of a free-radical initiator in an unsaturated polyol mixture containing less than 0.1 mole of induced unsaturation per mole of polyol mixture. In another embodiment of the invention the polymerization of an ethylenically unsaturated monomer or mixture of monomers in the presence of an effective amount of a free radical initiator in an unsaturation containing polyol mixture containing less than 0.1 mole of unsaturation per mole of polyol mixture employs an improved process which comprises conducting the polymerization in a polyol mixture employing as part of the mixture a polyetherester polyol prepared by the reaction of a polyoxyalkylene polyether polyol with maleic anhydride and an alkylene oxide. This polyetherester polyol is isomerized by methods well known by those skilled in the art. These include heat, or isomerization catalysts such as morpholine dibutylamine, diethylamine, diethanolamine, thiols and the like. In another improved process for the preparation of these graft polymer dispersions, the improvement consists of preparing a polyetherester polyol by the reaction of a polyoxyalkylene ether polyol, a polycarboxylic acid anhydride to form a half acid ester and an alkylene oxide to obtain a product having an acid number of less than 5 mg KOH/gram which comprises conducting the reaction between the polyoxyalkylene polyether polyol and the anhydride and the following reaction with the alkylene oxide in the presence of an effective amount of a catalyst selected from the group consisting of salts and oxides of divalent metals. The polyols having induced unsaturation are hereinafter referred to as "macromers." Chain transfer agents may be employed as reaction moderators particularly at temperatures below 105° C. The polymerization reaction may be carried out at temperatures between 25° C. and 180° C., preferably between 80° C. and 135° C. The polyol mixture contains less than 0.1 mole of unsaturation per mole of polyol mixture and ranges from 0.001 to 0.09 mole of unsaturation.

The alkylene oxides which may be employed for the preparation of the polyetherester polyols include ethylene oxide, propylene oxide, butylene oxide, amylene oxide and mixtures of these oxides.

The graft polymer dispersions of this invention have viscosities less than 10,000 cps at 25° C. Preferably they have viscosities ranging from 2000 to 8000 cps at 25° C.

Among those chain transfer agents which may be employed are as follows: acetic acid, bromoacetic acid, chloroacetic acid, ethyl dibromoacetate, iodoacetic acid, tribromoacetic acid, ethyl tribromoacetate, trichloroacetic acid, ethyl trichloroacetate, acetone, p-bromophenylacetornitrile, p-nitrophenylacetylene, allyl alcohol, 2,4,6-trinitroaniline, p-ethynylanisole, 2,4,6-trinitroanisole, azobenzene, benzaldehyde, p-cyanobenzaldehyde, 2-butylbenzene, bromobenzene, 1,3,5-trinitrobenzene, benzochrysene, ethyl trinitrobenzoate, benzoin, benzonitrile, benzopyrene, tributylborane, 1,4-butanediol, 3,4-epoxy-2-methyl-1-butene, t-butyl ether, t-butyl isocyanide, 1-phenylbutyne, p-cresol, p-bromocumene, dibenzonaphthacene, p-dioxane, pentaphenyl ethane, ethanol, 1,1-diphenylethylene, ethylene glycol, ethyl ether, fluorene, N,N-dimethylformamide, 2-heptene, 2-hexene, isobutyraldehyde, diethyl bromomalonate, bromotrichloromethane, dibromoethane, diiodomethane, naphthalene, 1-naphthol, 2-napthol, methyl oleate, 2,4,4-triphenyl-1-pentene, 4-methyl-2-pentene, 2,6-diisopropylphenol, phenyl ether, phenylphosphine, diethylphosphine, dibutylphosphine, phosphorus trichloride, 1,1,1-tribromopropane, dialkyl phthalate, 1,2-propanediol, 3-phosphinopropionitrile, 1-propanol, pyrocatechol, pyrogallol, methyl stearate, tetraethylsilane, triethylsilane, dibromostilbene, α-bromostyrene, α-methylstyrene, tetraphenyl succinonitrile, 2,4,6-trinitrotoluene, p-toluidine, N,N-dimethyl-p-toluidine, α-cyano-p-tolunitrile, α,α'-dibromo-p-xylene, 2,6-xylenol diethyl zinc, dithiodiacetic acid, ethyl dithiodiacetic acid, 4,4'-dithio-bisanthranilic acid, benzenethiol, o-ethoxybenzenethiol, 2,2'-dithiobisbenzothiazole, benzyl sulfide, 1-dodecanethiol, ethanethiol, 1-hexanethiol, 1-napthalenethiol, 2-napthalenethiol. 1-octanethiol. 1-heptanethiol, 2-octanethiol, 1-tetradecanethiol, a-toluenethiol, isopropanol, 2-butanol, carbon tetrabromide and tertiary dodecyl mercaptan.

The chain transfer agents employed will depend on the particular monomers or mixtures of monomers employed and the molar ratios of such mixtures. The concentration of the chain transfer agent which is employed may range from 0.1 to 10 percent by weight based on the weight of monomer.

Representative polyols essentially free from ethylenic unsaturation which may be employed in combination with the macromers of the invention are well known to those skilled in the art. They are often prepared by the catalytic condensation of an alkylene oxide or mixture of alkylene oxides either simultaneously or sequentially with an organic compound having at least two active hydrogen atoms, such as evidenced by U.S. Pat. Nos. 1,922,459; 3,190,927; and 3.346,557. Representative polyols include polyhydroxyl-containing polyesters, polyoxyalkylene polyether polyols, polyhydroxy-terminated polyurethane polymers, polyhydroxyl-containing phosphorus compounds, and alkylene oxide adducts of polyhydric polythioesters, polyacetals, aliphatic polyols and thiols, ammonia, and amines including aromatic, aliphatic, and heterocyclic amines, as well as mixtures thereof. Alkylene oxide adducts of compounds which contain 2 or more different groups within the above-defined classes may also be used, for example, amino alcohols which contain an amino group and a hydroxyl group. Also, alkylene oxide adducts of compounds which contain one SH group and one OH group as well as those which contain an amino group and an SH group may be used. Generally, equivalent weight of the polyols will vary from 100 to 10,000, preferably from 1000 to 3000.

Any suitable hydroxy-terminated polyester may be used such are prepared, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α,β-diethylsuccinic acid, isophthalic acid, terephthalic acid, hemimellitic acid, and 1,4-cyclohexanedicarboxylic acid. Any suitable polyhydric alcohol, including both aliphatic and aromatic, may be used such as ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, a-methyl glucoside, pentaerythritol, and sorbitol. Also included within the term "polyhydric alcohol" are compounds derived from phenol such as 2,2-bis(4-hydroxyphenyl)propane, commonly known as Bisphenol A.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxylcontaining polyester with only a portion of the components being a diamine such as ethylene diamine.

Any suitable polyoxyalkylene polyether polyol may be used such as the polymerization product of an alkylene oxide or a mixture of alkylene oxides with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and mixtures of these oxides. The polyoxyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyoxyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-oxybutylene and polyoxyethylene glycols, and random copolymer glycols prepared from blends of two or more alkylene oxides or by the sequential addition of two or more alkylene oxides. The polyoxyalkylene polyether polyols may be prepared by any known process such as, for example, the process disclosed by Wurtz in 1859 and *Encyclopedia of Chemical Technology*, Vol. 7, pp. 257–262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2'-(4,4'-hydroxyphenyl)propane and blends thereof having equivalent weights of from 100 to 5000.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thioether glycol.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Suitable polyacetals which may be condensed with alkylene oxides include the reaction product of formaldehyde or other suitable aldehyde with a dihydric alcohol or an alkylene oxide such a those disclosed above.

Suitable aliphatic thiols which may be condensed with alkylene oxides include alkanethiols containing at least two -SH groups such as 1,2-ethanedithiol, 1,2-propanedithiol, 1,3-propanedithiol, and 1,6-hexanedithiol; alkene thiols such as 2-butene-1,4-dithiol; and alkyne thiols such as 3-hexyne-1,6-dithiol.

Suitable amines which may be condensed with alkylene oxides include aromatic amines such as aniline, o-chloroaniline, p-aminoaniline, 1,5-diaminonaphthalene, methylene dianiline, the condensation products of aniline and formaldehyde, and 2,3-, 2,6-, 3,4-, 2,5-, and 2,4- diaminotoluene; aliphatic amines such as methylamine, triisopropanolamine, ethylenediamine, 1,3-diaminopropane, 1,3-diaminobutane, and 1,4-diaminobutane.

Also, polyols containing ester groups can be employed in the subject invention. These polyols are prepared by the reaction of an alkylene oxide with an organic dicarboxylic acid anhydride and a compound containing reactive hydrogen atoms. A more comprehensive discussion of these polyols and their method of preparation can be found in U.S. Pat. Nos. 3,585,185; 3,639,541 and 3,639,542.

The unsaturated polyols or macromers which are employed in the present invention may be prepared by the reaction of any conventional polyol such as those described above with an organic compound having both ethylenic unsaturation and a hydroxyl, carboxyl, anhydride, isocyanate or epoxy group or they may be prepared by employing an organic compound having both ethylenic unsaturation and hydroxyl, carboxyl, anhydride, or epoxy group as a reactant in the preparation of the conventional polyol. Representative of such organic compounds include unsaturated mono- and polycarboxylic acids and anhydrides such as maleic acid and anhydride, fumaric acid, crotonic acid and anhydride, propenyl succinic anhydride, acrylic acid, acryoyl chloride, hydroxy ethyl acrylate or methacrylate and halogenated maleic acids and anhydrides, unsaturated polyhydric alcohols such as 2-butene-1,4-diol, glycerol allyl ether, trimethylolpropane allyl ether, pentaerythritol allyl ether, pentaerythritol vinyl ether, pentaerythritol diallyl ether, and 1-butene-3,4-diol, unsaturated epoxides such as 1-vinylcyclohexane -3,4-epoxide, butadiene monoxide, vinyl glycidyl ether(1-vinyloxy-2,3-epoxy propane), glycidyl methacrylate and 3-allyloxypropylene oxide (allyl glycidyl ether). If a polycarboxylic acid or anhydride is employed to incorporate unsaturation into the polyols, it is preferable to react the unsaturated polyol with an alkylene oxide, preferably ethylene or propylene oxide, to replace the carboxyl groups with hydroxyl groups prior to employment in the present invention. The amount of alkylene oxide employed is such as to reduce the acid number of the unsaturated polyol to about 5 or less.

The maleated macromers are isomerized at temperatures ranging from 80° C. to 120° C. for one-half hour to three hours in the presence of an effective amount of an isomerization catalyst. The catalyst is employed at concentrations greater than 0.01 weight percent based on the weight of the macromer.

When preparing the polyetherester polyol employing the catalyst selected from the group consisting of salts and oxides of divalent metals, the concentration of catalyst which may be employed ranges from 0.005 to 0.5 weight percent based on the weight of polyol mixture. The temperatures employed range from 75° C. to 175° C. The equivalent weight of the macromer may vary from 1000 to 10,000, preferably from 2000 to 6000.

Among the divalent metals which may be employed are: zinc acetate, zinc chloride, zinc oxide, zinc neodecanoate, tin chloride, calcium naphthenate, calcium chloride, calcium oxide, calcium acetate, copper naphthenate, cadmium acetate, cadmium chloride, nickel chloride, manganese chloride, and manganese acetate.

Certain of the above-mentioned catalysts such as calcium naphthenate promote the isomerization of the maleate to the fumarate structure during the preparation of the macromer, while others such as zinc chloride, which is an effective catalyst for the polymerization, inhibit this isomerization.

As mentioned above, the graft polymer dispersions of the invention are prepared by the in situ polymerization, in the above-described polyols of an ethylenically unsaturated monomer or a mixture of ethylenically unsaturated monomers. Representative ethylenically unsaturated monomers which may be employed in the present invention include butadiene, isoprene, 1,4-pentadiene, 1,6-hexadiene, 1,7-octadiene, styrene, $\alpha$-methylstyrene, 2-methylstyrene, 3-methylstyrene and 4-methylstyrene, 2,4-dimethylstyrene, ethylstyrene, isopropylstyrene, butylstyrene, phenylstyrene, cyclohexylstyrene, benzylstyrene, and the like; substituted styrenes such as cyanostyrene, nitrostyrene, N,N-dimethylaminostyrene, acetoxystyrene, methyl 4-vinylbenzoate, phenoxystyrene, p-vinylphenyl oxide, and the like; the acrylic and substituted acrylic monomers such as acrylonitrile, acrylic acid, methacrylic acid, methyl acrylate, 2hydroxyethyl acrylate, methyl methacrylate, cyclohexyl methacrylate, benzyl methacrylate, isopropyl methacrylate, octyl methacrylate, methacrylonitrile, ethyl $\alpha$-ethoxyacrylate, methyl $\alpha$-acetaminoacrtylate, butyl acrylate, 2-ethylhexyl acrylate, phenyl acrylate, phenyl methacrylate, N,N-dimethylacrylamide, N,N-dibenzylacrylamide, N-butylacrylamide, methacrylyl formamide, and the like; the vinyl esters, vinyl ethers, vinyl ketones, etc., such as vinyl acetate, vinyl butyrate, isopropenyl acetate, vinyl formate, vinyl acrylate, vinyl methacrylate, vinyl methoxyacetate, vinyl benzoate, vinyltoluene, vinylnaphthalene, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxy diethyl ether, vinyl methyl ketone, vinyl ethyl ketone, vinyl phosphonates such as vinyl phenyl ketone, vinyl ethyl sulfone, N-methyl-N-vinyl acetamide, N-vinyl-pyrrolidone, vinyl imidazole, divinyl sulfoxide, divinyl sulfone, sodium vinylsulfonate, methyl vinylsulfonate, N-vinyl pyrrole, and the like; dimethyl fumarate, dimethyl maleate, maleic acid, crotonic acid, fumaric acid, itaconic acid, monomethyl itaconate, t-butylaminoethyl methacrylate, dimethylaminoethyl methacrylate, glycidyl acrylate, allyl alcohol, glycol monoesters of itaconic acid, vinyl pyridine, and the like. Any of the known polymerizable monomers can be used and the compounds listed above are illustrative and not restrictive of the monomers suitable for use in this invention. Preferably, the monomer is selected from the group consisting of acrylonitrile, styrene and mixtures thereof.

The amount of ethylenically unsaturated monomer employed in the polymerization reaction is generally from 25 percent to 60 percent, preferably from 30 percent to 45 percent, based on the total weight of the product. The polymerization occurs at a temperature between about 25° C. and 180° C. preferably from 80°C. to 135°C. It is preferred that at least 55 to 100 weight percent of the monomer employed is styrene or 4-methylstyrene.

Illustrative polymerization initiators which may be employed are the well-known free radical types of vinyl polymerization initiators such as the peroxides, persulfates, perborates percarbonates, azo compounds, etc. These include hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, paramenthane hydroperoxide, diacetyl peroxide, di-$\alpha$-cumyl peroxide, dipropyl peroxide, diisopropyl peroxide, isopropyl-t-butyl peroxide, butyl-t-butyl peroxide, difuroyl peroxide, bis(triphenylmethyl) peroxide, bis(p-methoxybenzoyl) peroxide, p-monomethoxybenzoyl peroxide, rubene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-decalin hydroperoxide, $\alpha$-methylbenzyl hydroperoxide, $\alpha$-methyl-$\alpha$-ethyl benzyl hydroperoxide, tetralin hydroperoxide, triphenylmethyl hydroperoxide, diphenylmethyl hydroperoxide, $\alpha$, $\alpha'$-azobis-(2-methyl heptonitrile), 1,1'-azo -bis(cyclohexane carbonitrile), 4,4'-azobis(4-cyanopentanoic acid), 2,2'-azobis(isobutyronitrile), 1-t-butylazo-1-cyanocyclohexane, persuccinic acid, diisopropyl peroxy dicarbonate, 2,2'-azobis(2,4-dimethylvaleronitrile), 2-t-butylazo-2-cyano-4-methoxy-4-methylpentane,2,2'-azobis-2-methylbutanenitrile, 2-t-butylazo-2-cyanobutane, 1-t-amylazo-1-cyanocyclohexane, 2,2'-azobis(2,4-dimethyl-4-methoxyvaleronitrile, 2,2'-azobis-2-methylbutyronitrile, 2-t butylazo-2-cyano-4-methylpentane, 2-t-butylazo-2-butyronitrile, to butylperoxyisopropyl carbonate and the like; a mixture of initiators may also be used. The preferred initiators are 2,2'-azobis(2-methylbutyronitrile), 2,2'-azobis(isobutyronitrile), 2,2'-azobis(2,4-dimethylvaleronitrile), 2-t-butylazo-2-cyano-4-methoxy-4-methylpentane, 2-t-butylazo-2-cyano-4-methylpentane, 2-t-butylazo2-cyano-butane and lauroyl peroxide. Generally, from about 0.1 percent to about 10 percent, preferably from about 1 percent to about 4 percent, by weight of initator based on the weight of the monomer will be employed in the process of the invention.

The polyurethane foams employed in the present invention are generally prepared by the reaction of a graft polymer dispersion with an organic polyisocyanate in the presence of a blowing agent and optionally in the presence of additional polyhydroxyl-containing components chain-extending agents, catalysts, surface-active agents, stabilizers. dyes, fillers and pigments. Suitable processes for the preparation of cellular polyurethane plastics are disclosed in U.S. Reissue Pat. No. 24,514 together with suitable machinery to be used in conjunction therewith. When water is added as the blowing agent, corresponding quantities of excess isocyanate to react with the water and produce carbon dioxide may be used. It is possible to proceed with the preparation of the polyurethane plastics by a prepolymer technique wherein an excess of organic polyisocyanate is reacted in a first step with the polyol of the present invention to prepare a prepolymer having free isocyanate groups which is then reacted in a second step with water and/or additional polyol to prepare a foam. Alternatively, the components may be reacted in a single working step commonly known as the "one-shot" technique of preparing polyurethanes. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoroethane, vinylidene chloride, and methylene chloride may be used as blowing agents.

Organic polyisocyanates which may be employed include aromatic, aliphatic, and cycloaliphatic polyisocyanates and combinations thereof. Representative of these types are the diisocyanates such as m-phenylene diisocyanate, 2,4-toluene diisocyanate, 2,6-toluene diisocyanate, mixtures of 2,4- and 2,6-toluene diisocyanate, hexamethylene diisocyanate, tetramethylene diisocyanate, cyclohexane-1,4-diisocyanate, hexahydrotoluene diisocyanate (and isomers), naphthalene-1,5-diisocyanate, 1-methoxyphenyl-2,4-diisocyanate, 4,4'-diphenylmethane diisocyanate, 4,4'-biphenylene diisocyanate, 3,3'-dimethoxy-4,4'-biphenyl diisocyanate, 3,3'-dimethyl-4,4'-biphenyl diisocyanate and 3,3'-dimethyldipenylmethane -4,4'-diisocyanate; the triisocyanates such as 4,4', 4"-triphenylmethane triisocyanate, and toluene 2,4,6-triisocyanate; and the tetraisocyanates such as 4,4'-dimethyldiphenylmethane-2,2'-5,5'-tetraisocyanate and polymeric polyisocyanates such as polymethylene polyphenylene polyisocyanate. Especially useful due to their availability and properties are toluene diisocyanate, 4,4'-diphenylmethane diisocyanate and polymethylene polyphenylene polyisocyanate.

Crude polyisocyanates may also be used in the compositions of the present invention such as crude toluene diisocyanate obtained by the phosgenation of a mixture of toluene diamines or crude diphenylmethane isocyanate obtained by the phosgenation of crude diphenylmethane diamine. The preferred or crude isocyanates are disclosed in U.S. Pat. No. 3,215,652.

As mentioned above, the graft polyols may be employed along with another polyhydroxyl-containing component commonly employed in the art. Any of the polyhydroxylcontaining components which are described above for use in the preparation of the graft polyols may be employed in the preparation of the polyurethane foams useful in the present invention.

Chain-extending agents which may be employed in the preparation of the polyurethane foams include those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water, ethylene glycol, 1,4-butanediol and primary and secondary diamines which react more readily with the prepolymer than does water such as phenylene diamine, 1,4-cyclohexane-bis-(methylamine), ethylenediamine, diethylenetriamine, N-(2-hydroxypropyl)-ethylenediamine, N,N'-di(2-hydroxypropyl)ethylenediamine, piperazine, and 2-methylpiperazine.

Any suitable catalyst may be used including tertiary amines such as, for example, triethylenediamine, N-methylmorpholine, N-ethylmorpholine, diethylethanolamine, N-cocomorpholine, 1-methyl-4-dimethylaminoethylpiperazine, 3-methoxypropyldimethylamine, N,N,N'-trimethylisopropyl propylenediamine, 3-diethylaminopropyldiethylamine, dimethylbenzylamine, and the like. Other suitable catalysts are, for example, stannous chloride dibutyltin di-2-ethyl hexanoate, stannous oxide, as well as other organometallic compounds such as are disclosed in U.S. Pat. No. 846,408.

A surface-active agent is generally necessary for production of high grade polyurethane foam according to the present invention, since in the absence of same, the foams collapse or contain very large uneven cells. Numerous surface-active agents have been found satisfactory. Nonionic surface active agents are preferred. Of these, the nonionic surface-active agents such as the well-known silicones have been found particularly desirable. Other surface-active agents which are operative, although not preferred, include polyethylene glycol ethers of long chain alcohols, tertiary amine or alkanolamine salts of long chain alkyl acid sulfate esters, alkyl sulfonic esters, and alkyl arylsulfonic acids.

It has been found in the preparation of the flame retardant polyurethane foam products which have incorporated therein the graft polymer dispersions of the invention that less flame retardant compound is necessary to impart flame retardency. Among the flame retardants which may be employed are: pentabromodiphenyl oxide, dibromopropanol, tris(8-chloropropyl)phosphate, 2,2-bis(bromoethyl) 1,3-propanediol, tetrakis(2-chloroethyl)ethylene diphosphate, tris(2,3-dibromopropyl)phosphate, tris(8-chloroethyl)phoshate, tris(1,2-dichloropropyl)phosphate, bis-(2-chloroethyl) 2-chloroethylphosphonate, molybdenum trioxide, ammonium molybdate, ammonium phosphate, pentabromodiphenyloxide, tricresyl phosphate, hexabromocyclododecane and dibromoethyl- dibromocyclohexane. The concentrations of flame retardant compounds which may be employed range from 5 to 25 parts per 100 parts of polyol mixture.

The following examples illustrate the nature of the invention. All parts are by weight unless otherwise stated. In the examples, the physical properties of the polyurethane foam were determined by the following ASTM tests:
Density—D1622-63
Tensile Strength—D1623-72
Elongation—D412
Split Tear—D470
Compression Set—D395
Compression Load—D1564
Humid Aging—D1564

The following abbreviations are employed in the examples below:
Polyol A is a trimethylolpropane, propylene oxide, ethylene oxide adduct containing 15 percent ethylene oxide, and a hydroxyl number of 25.
Polyol B is a glycerine, propylene oxide, ethylene oxide adduct containing 12.5 percent ethylene oxide, and a hydroxyl number of 50.
Polyol C is a glycerine, propylene oxide, ethylene oxide adduct containing 18.5 percent ethylene oxide, having a hydroxyl number of 35.
Polyol D is Polyol A containing 0.5 mole of unsaturation per mole of polyol.
Polyol E is Polyol A containing 0.7 mole of unsaturation per mole of polyol.
Polyol F is a glycerine, ethylene oxide, propylene oxide adduct containing 6 percent ethylene oxide having a reduced unsaturation of 0.3 mole per mole of polyol, containing 36 weight percent of 3:1 acrylonitrile:styrene based on the total weight of the polymer and having a hydroxyl number of 32.5.

Polyol G see procedure D.

Polyol H is a glycerine, ethylene oxide propylene oxide adduct containing 16.5 percent ethylene oxide and having a hydroxyl number of 35.

Polyol I see procedure E.

Polyol J see procedure B.

Catalyst A - zinc neodeconate as ppm zinc.

Catalyst B - calcium naphthenate as ppm calcium.

Catalyst C - copper naphthenate as ppm copper.

Catalyst D - cobalt naphthenate as ppm cobalt Initiator A - 2,2'-azobis(2-methylbutyronitrile)

DE-71 is pentabromodiphenyl oxide manufactured by Great Lakes Chemicals.

Thermolin 101 is tetrakis(2-chloroethyl)ethylene diphosphate.

Reactant Blue X-44 is a dye manufacture by Milliken, Inc.

L-5720 is a silicone surfactant manufactured by Union Carbon and Carbide Corporation.

DABCO TL is an amine catalyst manufactured by Air Products, Inc.

T-10 is an organo tin catalyst manufactured by M&T Chemicals, Inc.

DOP is dioctylphthalate.

TDI is toluene diisocyanate.

L-5043 is a silicone surfactant manufactured by Dow Corning Corporation.

T-12 is dibutyltin dilaurate

DABCO 33Lv is a 33 percent solution of triethylene diamine in 67 percent dipropylene glycol.

NIAX A-1 is an amine catalyst manufactured by Union Carbon and Carbide Corporation.

AN is acrylonitrile

Sty is styrene

Antiblaze 19 reputedly has the structure $$(CH_3-O)_xP(=O)-(OCH_2-C(CH_2CH_3)(CH_2O)(CH_2O))P(=O)-CH_3)_{2-x}$$
$$|\quad\quad\quad\quad\quad\quad\quad\quad\quad CH_3$$

wherein x is equal to 0 or 1.

Procedure A

Charges:

The following charges were employed in examples 1 through 17 except as noted otherwise in Table 1.

2000 gm Polyol A 30.6 gm maleic anhydride (0.8 equivalents per mole of Polyol A)

10 gm catalyst B 200 ppm calcium 96 gm ethylene oxide (0.01 percent maximum water)

A 3-liter round-bottom flask with a stirrer, thermometer and gas inlet was charged with polyol A, maleic anhydride and calcium naphthenate. The contents were heated to 125° C. and allowed to react for 1 hour. This intermediate was transferred to a 1-gallon steam heated stainless steel autoclave. After heating to 125° C. and pressurizing the reactor to 34 psig with nitrogen, ethylene oxide was added during 1 hour and the mixture was reacted for 8 hours. The product was isolated after discharging by stripping the volatiles at 105° C. for 1 hour at <10 mm Hg. This product is designated as polyol D.

Procedure B

| Charges: | To reactor: 50 g polyol D |
|---|---|
| Stream #1: | 925 g polyol B |
|  | 2.0 g initiator A |
|  | 260 g acrylonitrile |
|  | 790 g styrene |
|  | 13.5 g 1-dodecanethiol |
| Stream #2: | 975 g polyol B |
|  | 10.5 g initator A |

Reaction Conditions: reaction temperature, 90° C.; monomer addition time, 210 minutes; polyol initiator addition time, 220 minutes; reaction time, 30 minutes; 300 rpm stirring.

The reactor charges were added to a 5-liter 4-neck flask fitted with a stirrer, nitrogen inlet, addition tube, water condenser and thermowell. After heating the polyol reaction mixture to 90° C. and holding for 30 minutes under nitrogen, the streams #1 and #2 were added through a Kenics static mixer over the specified time period. Upon completion of stream #1 addition the reaction mixture was heated to 110° C. and reacted for the specified time. After the reaction period was completed, the reaction mixture was vacuum stripped for 30 minutes at 115° C. and 1 mm Hg. The polyol from this procedure is designated as polyol J.

Procedure C

| Charges: | 400 lbs. polyol A |
|---|---|
|  | 7.72 lbs. maleic anhydride |
|  | 17.24 lbs. ethylene oxide |

The indicated amount of polyol A was charged to a clean, dry, nitrogen purged 90-gallon reactor, sealed and heated to 110° C. The polyol was then flash stripped at less than 10 mm Hg into a clean, dry 60-gallon reactor. Stripping was continued until the residual water level had been reduced to 0.01 weight percent. After stripping was completed, maleic anhydride was added to the polyol, the reaction mixture was padded with 34 psi nitrogen and then heated to 150° C. After reacting for 4 hours, excess ethylene oxide was added over 5 hours at 150° C. This reaction mixture was allowed to react 8 to 12 hours or until the acid number had dropped below 0.2 mg KOH/g. The mixture was then stripped to remove excess ethylene oxide. This product was designated as polyol E.

Procedure D

| Charges: | To reactor: 10.67 lbs. polyol E |
|---|---|
|  | 93.33 lbs. polyol B |
|  | 0.053 lb. morpholine |
|  | 0.21 lb. initiator A |
| Stream #1: | 28.0 lbs. acrylonitrile |
|  | 84.0 lbs. styrene |
|  | 1.12 lbs. 1-dodecanethiol |
| Stream #2: | 104.0 lbs. polyol B |
|  | 1.12 lbs. initiator A |

Reaction Conditions: reaction temperature, 90° C.; monomer addition time, 210 minutes; polyol-initiator addition time, 220 minutes; reaction time, 30 minutes.

The reactor charges were added under a nitrogen atomsphere to a 50-gallon reactor. After heating the polyol reaction mixture to 90° C. and holding for 30 minutes, streams #1 and #2 were added through a Kenics static mixer over the specified time period. Upon completion of stream #1 addition, the reaction mixture was heated to 110° C. and reacted for the specified time. After the reaction period was completed, the reaction mixture was vacuum stripped for 3 hours at 125° C. and 5 mm Hg. This product is designated as polyol G.

Procedure E

| Charges: | To reactor: 85.3 lbs. polyol C |
|---|---|
| Stream #1: | 26.7 lbs. polyol A |
| | 0.19 lb. initiator A |
| | 24 lbs. acrylonitrile |
| | 72 lbs. styrene |
| | 0.96 lb. 1-dodecanethiol |
| Stream #2: | 112.0 lbs. polyol C |

-continued

| Charges: | To reactor: 85.3 lbs. polyol C |
|---|---|
| | 0.96 lb. initator A |

Reaction Conditions: reaction temperature, 90° C.; monomer addition time, 180 minutes: polyol-initiator addition time, 190 minutes reaction time, 30 minutes.

The same reaction procedure was used here as in procedure D.

This product is designated polyol I.

EXAMPLES 1-17

The products of these examples were prepared employing various catalysts, at various concentrations and at variable maleic anhydride contents using procedure A.

TABLE I

| Examples | Maleic Anhydride, Equivalents* | Catalyst | Catalyst Level, ppm | OH No. | Acid No. | Saponification No. | Unsaturation mole/mole** | Viscosity cps, 25° C. |
|---|---|---|---|---|---|---|---|---|
| 1 | 0.8 | A | 800 | 25.5 | 0.57 | 22.2 | 0.6 | 11,900 |
| 2 | 0.8 | B | 800 | 25.2 | 0 | 13.8 | 0.4 | 12,200 |
| 3 | 0.8 | C | 800 | 22.2 | 1.3 | 18.6 | 0.6 | 2,760 |
| 4 | 0.8 | D | 800 | 22.5 | 0.05 | 15.6 | 0.35 | 15,250 |
| 5 | 0.8 | B | 800 | 26.3 | 0.22 | 15.1 | 0.45 | 9,425 |
| 6 | 1.0 | B | 800 | 21.6 | 0 | 19.2 | 0.40 | 17,290 |
| 7 | 1.5 | B | 800 | 23.9 | 0 | 27.1 | — | 100,000 |
| 8 | 0.8 | B | 400 | 24.0 | 0 | 11.3 | 0.37 | 8,485 |
| 9 | 0.8 | B | 200 | 21.6 | 0 | 11.6 | 0.48 | 7,370 |
| 10 | 0.8 | B | 100 | 20.7 | 0 | 16.3 | 0.55 | 11,390 |
| 11 | 0.8 | B | 200 | 22.3 | 0 | 16.7 | 0.48 | 8,030 |
| 12 | 0.8 | B | 200 | 17.9 | 0.8 | 16.6 | 0.35 | 16,830 |
| 13 | 0.8 | B | 200 | 21.7 | 0 | 19.3 | 0.55 | 10,230 |
| 14 | 0.75 | B | 200 | 24.8 | 0 | 16.9 | 0.50 | 8,360 |
| 15 | 0.85 | B | 200 | 25.6 | 0 | — | 0.50 | 9,430 |
| 16 | 0.9 | B | 200 | 21.2 | 0 | 24.0 | 0.50 | 12,070 |
| 17 | 0.8 | B | 200 | 23.4 | 0 | 17.2 | 0.55 | 10,000 |

*equivalents of maleic anhydride per mole of polyol.
**moles of induced unsaturation per mole of polyol.

EXAMPLES 18-41

The products listed in Table II and III were prepared by procedure B employing the indicated polyols, monomers and concentrations.

TABLE II

| Examples | Polyol D, g Charge | Polyol B, g Charge | Polyol B, g Feed | Dodecanethiol, g Feed | AN, g | Sty, g | Temperature °C. | Viscosity cps, 25° C. |
|---|---|---|---|---|---|---|---|---|
| 18 | 50 | 925 | 975* | 10.5 | 260 | 790 | 90 | 2840 |
| 19 | 50 | 925 | 975 | 13.5 | 260 | 790 | 90 | 2830 |
| 20 | 50 | 925 | 975 | 13.5 | 260 | 790 | 95 | 2970 |
| 21 | 60 | 915 | 975 | 13.5 | 260 | 790 | 90 | 2910 |
| 22 | 50 | 925 | 975 | 10.5 | 260 | 790 | 90 | coagulated |
| 23 | 50 | 925 | 975 | 13.5 | 260 | 790 | 90 | 3020 |
| 24 | 50 | 925 | 975 | 13.5 | 260 | 790 | 90 | 2750 |
| 25 | 60 | 885 | 945 | 14.0 | 278 | 832 | 90 | 3750 |
| 26 | 50 | 925 | 975 | 13.5 | 260 | 790 | 90 | 2700 |
| 27 | 10 | 185 | 195 | 2.1 | 52 | 158 | 90 | 2640 |
| 28 | 50 | 925 | 975 | 10.5 | 260 | 790 | 90 | 7380 |
| 29 | 75 | 900 | 975 | 10.5 | 260 | 790 | 90 | 6010 |
| 30 | 10 | 185 | 195 | 2.1 | 52 | 158 | 90 | 2860 |
| 31 | 50 | 925 | 975 | 10.5 | 260 | 790 | 90 | — |
| 32 | 50 | 925 | 975 | 13.5 | 260 | 790 | 90 | 3100 |
| 33 | 50 | 925 | 975 | 13.5 | 260 | 790 | 90 | 2900 |
| 34 | 50 | 925 | 975 | 12.5 | 260 | 790 | 90 | 3190 |
| 35 | 50 | 925 | 975 | 13.5 | 260 | 790 | 90 | 3100 |
| 36** | 50 | 925 | 975 | 10.5 | 260 | 790 | 90 | 2860 |
| 37 | 50 | 925 | 975 | 14.5 | 260 | 790 | 90 | 2910 | g = grams
*3 gms methylbenzyldiphenylamine added.
**Initiator 2-t-butylazo-2-cyano-4-methylpentane.

TABLE III

| Examples | Polyol D, g Charge | Polyol C, g Charge | Polyol C, g Feed | Dodecanethiol, g Feed | AN, g | Sty, g | Temperature °C. | Viscosity cps, 25° C. |
| --- | --- | --- | --- | --- | --- | --- | --- | --- |
| 38 | 10 | 185 | 195 | 2.1 | 52 | 158 | 90 | 3980 |
| 39 | 50 | 1000 | 105 | 9.0 | 225 | 675 | 90 | 3260 |
| 40 | 50 | 1000 | 105 | 9.0 | 225 | 675 | 90 | 2990 |
| 41 | 60 | 990 | 1050 | 9.0 | 225 | 675 | 90 | 3240 |

EXAMPLES 42–93

Examples 48 and 52 were prepared by adding to a 500 ml flask fitted with a stirrer and a nitrogen inlet tube, 700 grams of polyol E and 0.7 grams of morpholine. The reaction mixture was heated to 90° C. for 1 hour, then vacuum stripped for 30 minutes at 1 mm Hg pressure. Analysis by nuclear magnetic resonance showed 0.85 moles of fumarate unsaturation. This product was used in preparing the products of Examples 48 and 52. The remainder of the examples were prepared employing procedure D.

TABLE IV

| Examples | Polyol E, g Charge | Polyol B, g Charge | Polyol B, g Feed | Dodecanethiol, g Feed | AN, g | Sty, g | Temperature °C. | Viscosity csp, 25° C. |
| --- | --- | --- | --- | --- | --- | --- | --- | --- |
| 42 | 100 | 875 | 975 | 10.1 | 260 | 790 | 85 | 3350 |
| 43 | 75 | 900 | 975 | 10.5 | 260 | 790 | 90 | 6760 |
| 44 | 75 | 900 | 975 | 10.5 | 260 | 790 | 90 | 5840 |
| 45 | 100 | 875 | 975 | 10.1 | 260 | 790 | 80 | 3050 |
| 46 | 75 | 900 | 975 | 10.5 | 260 | 790 | 90 | 3340 |
| 47 | 20 | 175 | 195 | 2.1* | 52 | 158 | 90 | 3020 |
| 48 | 20 | 175 | 195 | 2.1 | 52 | 158 | 90 | 3800 |
| 49 | 100 | 845 | 945 | 11.1 | 278 | 832 | 90 | 4440 |
| 50 | 75 | 900 | 975 | 10.5 | 260 | 790 | 90 | 4580 |
| 51 | 75 | 900 | 975 | 10.5 | 260 | 790 | 90 | 5750 |
| 52 | 75 | 900 | 975 | 10.5 | 260 | 790 | 90 | 12780 |
| 53 | 75 | 705 | 117 | 10.5 | 260 | 790 | 90 | 3200 |
| 54 | 100 | 845 | 945 | 11.1 | 278 | 832 | 90 | 3860 |
| 55 | 75 | 900 | 975 | 10.5 | 260 | 790 | 90 | 7890 |
| 56 | 20 | 175 | 195 | 2.1 | 42 | 168 | 90 | 3270 |
| 57 | 20 | 175 | 195 | 2.1 | 52 | 158 | 90 | 3290 |
| 58 | 100 | 875 | 975 | 10.5 | 260 | 790 | 90 | 3480 |
| 59 | 100 | 875 | 975 | 10.5 | 260 | 790 | 90 | 3050 |
| 60 | 20 | 175 | 195 | 2.1 | 21 | 189 | 90 | 36000 |
| 61 | 20 | 175 | 195 | 2.1 | 63 | 147 | 90 | 7960 |
| 62 | 40 | 350 | 390 | 4.2 | 104 | 316 | 90 | 11520 |
| 63 | 20.6 | 160.4 | 180.1 | 2.4 | 60.1 | 180 | 75–119 | 5810 |
| 64 | 20 | 175 | 195 | 2.1 | 52 | 158 | 90 | 4080 |
| 65 | 20 | 175 | 195 | 2.1 | 52 | 158 | 90 | 4600 |
| 66 | 20 | 175 | 195 | 2.1 | 52 | 158 | 90 | 4630 |
| 67 | 10 | 185 | 195 | 2.1 | 52 | 158 | 90 | 6180 |
| 68 | 20 | 175 | 195 | 2.1 | 52 | 158 | 90 | 3660 |
| 69 | 20 | 175 | 195 | 2.6 | 52 | 158 | 90 | 4870 |
| 70 | 15 | 180 | 195 | 2.1 | 52 | 158 | 90 | 3060 |
| 71 | 15 | 180 | 195 | 2.1 | 52 | 158 | 90 | 3210 |
| 72 | 75 | 900 | 975 | 10.5 | 260 | 790 | 90 | 3440 |
| 73 | 100 | 875 | 975 | 10.5 | 260 | 790 | 90 | 3760 |
| 74 | 100 | 875 | 975 | 10.5 | 260 | 790 | 90 | 3020 |
| 75 | 100 | 550 | 1300 | 10.5 | 260 | 790 | 90 | 3600 |
| 76 | 100 | 875 | 975 | 10.5 | 260 | 790 | 90 | 2910 |
| 77 | 100 | 875 | 975 | 10.5 | 260 | 790 | 90 | 3250 |
| 78 | 100 | 825 | 975 | 10.5 | 260 | 790 | 90 | 3300 |
| 79 | 50.6 | 144.4 | 195.2 | 2.1 | 52 | 158 | 90 | 8900 |
| 80 | 20.1 | 175 | 195.2 | 2.1 | 52 | 158 | 90 | 4010 |
| 81 | 20.0 | 160 | 180 | 2.4 | 60 | 180.1 | 90 | 8170 |
| 82 | 20 | 175 | 195 | 2.1 | 52 | 158 | 85 | 4410 |
| 83 | 100 | 875 | 975 | 10.5 | 260 | 790 | 90 | 3540 |
| 84 | 100 | 875 | 975 | 10.5 | 260 | 790 | 90 | 4130 |
| 85 | 15 | 180 | 195 | 2.1 | 52 | 158 | 90 | 3620 |
| 86 | 20 | 175 | 195 | 2.1 | 52 | 158 | 90 | 3500 |
| 87 | 18 | 177 | 195 | 2.1 | 52 | 158 | 90 | 3340 |
| 88 | 16 | 179 | 195 | 2.1 | 52 | 158 | 90 | 3300 |
| 89 | 22 | 173 | 195 | 2.1 | 52 | 158 | 90 | 4000 |
| 90 | 20 | 175 | 195 | 2.1 | 52 | 158 | 90 | 3440 |
| 91 | 20 | 240 | 130 | 2.1 | 52 | 158 | 90 | 3320 |
| 92 | 20 | 175 | 195 | 2.1 | 52 | 158 | 90 | 3300 |
| 93 | 20 | 370 | — | 2.1 | 52 | 158 | 90 | 4500 |

*bromotrichloromethane used instead of dodecanethiol.

EXAMPLES 94–110

The products of Table V were prepared employing procedure E except products of Examples 111 and 112 where polyol E was replaced by polyol A.

TABLE V

| Examples | Polyol E, g Charge | Polyol B, g Charge | Polyol B, g Feed | Dodecanethiol, g Feed | AN, g | Sty, g | Temperature °C. | Viscosity csp, 25° C. |
|---|---|---|---|---|---|---|---|---|
| 94 | 60 | 135 | 195 | 2.1 | 52 | 158 | 95 | 5340 |
| 95 | 70 | 160 | 190.4 | 1.8 | 45 | 135 | 90 | 3070 |
| 96 | 50 | 160 | 210 | 1.4 | 45 | 135 | 90 | 21200 |
| 97 | 49.9 | 160 | 210 | 1.8 | 45 | 135 | 90 | 2680 |
| 98 | 50 | 145 | 195.3 | 2.1 | 52 | 158 | 90 | 4260 |
| 99 | 60.1 | 134.9 | 195.1 | 2.1 | 52 | 158 | 90 | 4550 |
| 100 | 60 | 135 | 195 | 2.1 | 52 | 158 | 90 | 3940 |
| 101 | 60 | 135 | 195 | 1.6 | 52 | 158 | 90 | 5010 |
| 102 | 60 | 135 | 195 | 2.1 | 52 | 158 | 85 | 3960 |
| 103 | 300 | 675 | 975 | 10.5 | 260 | 790 | 90 | 4290 |
| 104 | 60 | 135 | 195 | 2.1 | 52 | 158 | 80 | 3560 |
| 105 | 60 | 135 | 195 | 1.9 | 52 | 158 | 90 | 3960 |
| 106 | 60 | 135 | 195 | 1.7 | 52 | 158 | 90 | 4020 |
| 107 | 60 | 135 | 195 | 2.3 | 52 | 158 | 90 | 3830 |
| 108 | 60 | 135 | 195 | 2.5 | 52 | 158 | 90 | 3830 |
| 109 | 60 | 135 | 195 | 2.1 | 52 | 158 | 90 | 5600 |
| 110 | 20 | 175 | 195 | 2.1 | 52 | 158 | 90 | 7270 |

EXAMPLES 111–127

The polyurethane foams of Tables VI, VII and VIII were prepared by charging a one quart cylindrical container with a suitable quantity of the polyol, water, catalysts, silicone surfactant and flame retardant compounds. The mixture was stirred for about 30 seconds, allowed to set for about 15 seconds and then stirring was resumed. After about 60 seconds elapsed time, the polyisocyanate was added to the container, and the resulting mixture was stirred for about 4 to 5 seconds. The content of the container was then immediately poured into a cardboard cake box, and the foam was allowed to rise therein. After the foam rise was completed, the resulting foam was oven cured for about 15 minutes.

Tables VI, VII and VIII set forth the ingredients and amounts thereof used to prepare the foams as well as the physical properties of the foams.

The flame retardancy tests, as exemplified by the Calif. No. 117 open flame test, indicate that flame retardancy may be obtained with reasonably low levels of flame retardant compounds employing the polymer dispersions of the instant invention.

TABLE VI

| Example | 111 | 112 | 113 | 114 | 115 | 116 |
|---|---|---|---|---|---|---|
| Polyol | G | G | G | F | F | F |
| Formulation, pbw | | | | | | |
| Polyol | 100.0 | — | — | — | — | — |
| DE-71 | 6.0 | — | — | — | — | — |
| THERMOLIN 101 | 3.0 | 6.0 | 12.0 | 3.0 | 6.0 | 12.0 |
| REACTINT Blue X-44 | 0.25 | 0.5 | 1.0 | 0.25 | 0.5 | 1.0 |
| Water | 2.8 | — | — | — | — | — |
| DABCO TL | 0.11 | — | — | — | — | — |
| T-10 | 0.4 | — | — | — | — | — |
| DOP | 0.8 | — | — | — | — | — |
| TDI | 37.1 | — | — | — | — | — |
| Foam Properties | | | | | | |
| Density, pcf | 2.18 | 2.25 | 2.24 | 2.17 | 2.19 | 2.33 |
| Tensile strength, psi | 23.3 | 25.8 | 25.6 | 28.1 | 25.4 | 27.8 |
| Elongation, % | 77 | 87 | 110 | 73 | 90 | 93 |
| Tear, pi | 2.4 | 2.3 | 3.1 | 2.0 | 2.1 | 2.5 |
| Resilience, % | 30 | 26 | 28 | 32 | 24 | 26 |
| ILD, lb/50 sq. in. (4 inch) | | | | | | |
| 25% | 118.0 | 112.0 | 102.0 | 124.0 | 116.4 | 110.0 |
| 65% | 247.2 | 231.6 | 211.6 | 264.0 | 242.0 | 232.4 |
| 25% return | 69.2 | 67.2 | 57.2 | 68.8 | 64.4 | 62.8 |
| Sag factor | 2.09 | 2.07 | 2.07 | 2.13 | 2.08 | 2.11 |
| Guide factor | 54.1 | 49.8 | 45.5 | 57.1 | 53.2 | 47.2 |
| Recovery, % | 59.0 | 60.0 | 56.0 | 55.0 | 55.0 | 57.0 |
| 50% | 57.1 | 71.3 | 89.7 | 14.5 | 58.2 | 72.0 |
| 90% | 81.1 | 95.7 | 98.0 | 83.4 | 95.8 | 96.8 |
| Humid aged 5 hrs. at 250° F. CLD, % CLD, % of original | | | | | | |
| 50% | 61.1 | 71.0 | 74.0 | 80.0 | 84.0 | 79.0 |
| Compression sets, % | | | | | | |
| 50% | 57.4 | 66.9 | 87.0 | 25.4 | 57.7 | 66.1 |
| 90% | 76.3 | 92.9 | 97.6 | 26.2 | 83.8 | 90.2 |
| Heat aged 22 hrs. at 284° F. tensile | | | | | | |
| strength, psi | 29.6 | 31.8 | 31.6 | 31.5 | 33.0 | 34.9 |
| Air flow, cfm | 0.80 | 0.86 | 0.45 | 1.92 | 1.10 | 1.10 |
| Foam color | white | | | tan | | |

TABLE VI-continued

| Example | | 117 | 118 | 119 | 120 | 121 | 122 |
|---|---|---|---|---|---|---|---|
| Polyol | | G | G | G | F | F | F |
| Water | | 2.8 | — | — | — | — | — |
| DE-71 | | 6.0 | — | — | — | — | — |
| THERMOLIN 101 | | 3.0 | 6.0 | 12.0 | 3.0 | 6.0 | 12.0 |

CALIFORNIA NO. 117 SECTION A PART I - OPEN FLAME TEST

| Original | Spec. Max. | | | | | | |
|---|---|---|---|---|---|---|---|
| Afterflame, sec. | | | | | | | |
| average | 5.0 | 18.6 | 2.6 | 2.6 | 30.0 | 34.0 | 37.0 |
| maximum | 10.0 | 22.0 | 4.0 | 3.0 | 32.0 | 35.0 | 38.0 |
| Char length, in. | | | | | | | |
| average | 6.0 | 5.4 | 2.6 | 2.6 | 12.0 | 12.0 | 12.0 |
| maximum | 8.0 | 6.0 | 3.3 | 2.9 | 12.0 | 12.0 | 12.0 |
| Heat aged 24 hrs./ 220° F. | | | | | | | |
| Afterflame, sec. | | | | | | | |
| average | 5.0 | 16.8 | 3.4 | 3.2 | 32.0 | 35.0 | 38.0 |
| maximum | 10.0 | 20.0 | 4.0 | 4.0 | 32.0 | 35.0 | 38.0 |
| Char length, in. | | | | | | | |
| average | 6.0 | 5.3 | 2.7 | 2.6 | 12.0 | 12.0 | 12.0 |
| maximum | 8.0 | 5.9 | 3.0 | 3.0 | 12.0 | 12.0 | 12.0 |

CALIFORNIA NO. 117 SECTION D PART II - SMOLDERING SCREENING TEST

| | Spec. Min. | | | | | | |
|---|---|---|---|---|---|---|---|
| Non-smoldered residue, % | 80.0 | 93.8 | 97.3 | 97.7 | burned completely | | |

BUTLER CHIMNEY

| Weight retention, % | | 69.1 | 92.7 | 95.5 | 0 | 63.0 | 94.5 |
|---|---|---|---|---|---|---|---|
| Flame height, cm | | 25+ | 22 | 19 | 25+ | 25+ | 20+ |

DOC FF-1-70 MENTHENAMINE PILL FLAME TEST

| | Spec. Min. | | | | | | |
|---|---|---|---|---|---|---|---|
| Inches burned from outer ring | >1 | 2.9 | 3.4 | 3.3 | 2.9 | 3.2 | 3.1 |

OXYGEN INDEX

| % $O_2$ | | 19.7 | 21.3 | 24.3 | 19.7 | 20.9 | 21.5 |
|---|---|---|---|---|---|---|---|

TABLE VII

FLAME TEST DATA ON 30/70 BLENDS OF POLYOL I/ POLYOL H

| Example | 123 | 124 | |
|---|---|---|---|
| Formulation | | | |
| Polyol I | 30 | 30 | |
| Polyol H | 70 | 70 | |
| Water | 2.0 | 2.0 | |
| DEOA | 0.8 | 0.8 | |
| L-5043 | 0.8 | 0.8 | |
| THERMOLIN 101 | 3.0 | 3.0 | |
| T-12 | 0.06 | 0.06 | |
| DABCO 33LV | 0.18 | 0.18 | |
| NIAX A-1 | 0.06 | 0.06 | |
| TDI index | 108 | 108 | |

California No. 117 Section A Part I - Open Flame Test

| | | | Spec. Max. |
|---|---|---|---|
| Afterflame, sec. | | | |
| average | 0.7 | 0.7 | 5.0 |
| maximum | 0.8 | 0.8 | 10.0 |
| Char length, in. | | | |
| average | 2.1 | 2.3 | 6.0 |
| maximum | 2.2 | 2.5 | 8.0 |

California No. 117 Section D Part II - Smoldering Screening Test

| | | | Spec. Min. |
|---|---|---|---|
| Non-smoldered residue | 86.4 | 89.0 | 80 |

TABLE VIII

| Example | 125 | 126 | 127 |
|---|---|---|---|
| Formulation | | | |
| Polyol J | 100.0 | — | — |
| THERMOLIN 101 | 3.0 | 12.0 | — |
| DE-71 | — | — | 12.0 |
| ANTIBLAZE 19 | — | — | 5.0 |
| Silicone L-5720 | 1.0 | — | — |
| Water | 2.4 | — | — |
| DABCO TL | 0.1 | — | — |
| T-10 | 0.4 | 0.4 | 0.3 |
| DOP | 0.8 | 0.8 | 0.6 |
| TDI (115 index) | 32.5 | — | — |
| Foam Properties | | | |
| Density, pcf | 2.19 | 2.32 | 2.27 |
| Tensile strength, psi | 24.6 | 26.2 | 25.3 |
| Elongation, % | 70 | 127 | 100 |
| Tear, pi | 2.5 | 2.9 | 2.5 |
| Resilience, % | 26 | 30 | 32 |
| ILD, lb/50 sq. in. (4 inch) | | | |
| 25% | 119.2 | 119.6 | 97.0 |
| 65 | 266.4 | 244.4 | 238.1 |
| 25% return | 71.2 | 72.0 | 49.2 |
| Sag factor | 2.23 | 2.04 | 2.45 |
| Guide factor | 54.4 | 51.6 | 42.7 |
| Recovery, % | 60.0 | 60.0 | 51.0 |
| Compression sets, % | | | |
| 50% | 25.4 | 82.4 | 73.9 |
| 90% | 53.4 | 96.1 | 96.2 |
| Humid aged 5 hrs. at 250° F. CLD, % | 80.0 | 67.0 | 82.0 |
| % of original 50% Compression sets, % | | | |

TABLE VIII-continued

| | | | | |
|---|---|---|---|---|
| 50% | | 23.9 | 65.4 | 59.5 |
| 90% | | 27.7 | 95.6 | 92.5 |
| Heat aged 22 hrs. at 284° F. tensile strength, psi | | 33.5 | 30.6 | 30.1 |
| Air flow, cfm | | 0.53 | 0.50 | 0.50 |
| Color | | white | | |
| Example | | 125 | 126 | 127 |

CALIFORNIA NO. 117 SECTION A PART I - OPEN FLAME TEST

| Original | Spec. Max. | | | |
|---|---|---|---|---|
| Afterflame, sec. | | | | |
| average | 5.0 | 19.4 | 1.6 | 1.6 |
| maximum | 10.0 | 26.0 | 3.0 | 2.0 |
| Char length, in. | | | | |
| average | 6.0 | 7.8 | 2.0 | 2.4 |
| maximum | 8.0 | 9.0 | 3.1 | 3.0 |
| Heat aged 24 hrs./ 220° F. | | | | |
| Afterflame, sec. | | | | |
| average | 5.0 | 15.2 | 1.4 | 1.2 |
| maximum | 10.0 | 21.0 | 3.0 | 2.0 |
| Char length, in. | | | | |
| average | 6.0 | 6.5 | 2.3 | 2.8 |
| maximum | 8.0 | 8.7 | 3.1 | 3.1 |

CALIFORNIA NO. 117 SECTION D PART II - SMOLDERING SCREENING TEST

| | Spec. Max. | | | |
|---|---|---|---|---|
| Non-smoldered residue, % | 80.0 | 96.6 | 99.2 | 99.9 |

BUTLER CHIMNEY

| | | | | |
|---|---|---|---|---|
| Weight retention, % | | 34.6 | 94.3 | 92.9 |
| Flame height, cm | | 25+ | 17 | 14 |

DOC FF-1-70 MENTHENAMINE PILL FLAME TEST

| | Spec. Min. | | | |
|---|---|---|---|---|
| Inches burned from outer ring | >1 | 3.5 | 3.3 | 3.1 |

The embodiments of the invention in which an exclusive privilege or property is claimed are defined as follows:

1. A process for the preparation of a white stable low viscosity graft polymer dispersion comprising the polymerization of 25 to 60 weight percent based on the total weight of the dispersion of an ethylenically unsaturated monomer, or mixture of said monomer in the presence of a chain transfer agent, in the presence of a free radical initiator in a polyol mixture containing from 0.001 to 0.09 mole of induced unsaturation per mole of said polyol mixture.

2. The process of claim 1 wherein the concentration of chain transfer agent is from 0.1 to 10 percent by weight based on the weight of the monomer.

3. The process of claim 1 wherein at least 55 percent of the monomer mixture is styrene.

4. The process of claim 1 wherein the amount of said monomer is from 30 to 45 weight percent based on the total weight of the dispersion.

5. A process for the preparation of a graft polymer dispersion comprising the polymerization of 25 to 60 weight percent based on the weight of the dispersion of an ethylenically unsaturated monomer or mixture of said monomers, in the presence of an effective amount of a free radical initiator in an isomerized polyol mixture wherein said polyol mixture containing from 0.001 to 0.09 mole of unsaturation per mole of polyol mixture is prepared by the reaction of a polyoxyalkylene polyether polyol with maleic anhydride and an alkylene oxide.

6. The process of claim 5 wherein said polymerization is conducted in the presence of a chain transfer agent.

7. The process of claim 5 wherein at least 55 percent of the monomer mixture is styrene.

8. The process of claim 5 wherein the amount of said monomer is from 30 to 45 percent based on the total weight of the dispersion.

9. A white stable low viscosity graft polymer dispersion comprising from 25 to 60 weight percent based on the total weight of the polymer dispersion of an ethylenically unsaturated monomer or mixture of monomers polymerized in a polyol mixture containing from 0.001 to 0.09 mole of induced unsaturation per mole of said polyol mixture and in the presence of a chain transfer agent.

10. The polymer dispersion of claim 9 wherein at least 55 percent of the monomer mixture is styrene.

11. The polymer dispersion of claim 9 wherein the amount of said monomer is from 30 to 45 weight percent based on the total weight of the dispersion.

12. A white stable graft polymer dispersion comprising from 25 to 60 weight percent based on the total weight of the polymer dispersion of an ethylenically unsaturated monomer or mixture of monomers polymerized in a macromer in the presence of a chain transfer agent, said macromer prepared by the reaction of a conventional polyol with an organic compound having both ethylenic unsaturation and a hydroxyl, carboxyl, or anhydride group, said macromer containing from 0.001 to 0.09 mole of induced unsaturation per mole of said macromer.

13. The polymer dispersion of claim 12 wherein the amount of said monomer is from 30 to 45 weight percent based on the total weight of the dispersion.

14. A white, stable graft polymer dispersion comprising from 25 to 60 weight percent based on the total weight of the polymer dispersion of an ethylenically unsaturated monomer or mixture of monomers polymerized, in the presence of a chain transfer agent, in a polyol mixture containing from 0.001 to 0.09 mole of unsaturation per mole of the polyol mixture wherein the polyol mixture comprises an isomerized polyether-ester polyol prepared by the reaction of a polyoxyalkylene polyether polyol with maleic anhydride and an alkylene oxide.

15. The polymer dispersion of claim 14 wherein the amount of said monomer is from 30 to 45 weight percent based on the total weight of the dispersion.

16. A flame retardant polyurethane foam prepared by the reaction of an organic polyisocyanate, a blowing agent, flame retardant and the polymer dispersion of claim 9.

17. A flame retardant polyurethane foam prepared by the reaction of an organic polyisocyanate, a blowing agent, flame retardant and the polymer dispersion of claim 10.

18. A flame retardant polyurethane foam prepared by the reaction of an organic polyisocyanate, a blowing agent, flame retardant and the polymer dispersion of claim 11.

19. A flame retardant polyurethane foam prepared by the reaction of an organic polyisocyanate, a blowing agent, flame retardant and the polymer dispersion of claim 12.

20. A flame retardant polyurethane foam prepared by the reaction of an organic polyisocyanate, a blowing agent, flame retardant and the polymer dispersion of claim 13.

21. A flame retardant polyurethane foam prepared by the reaction of an organic polyisocyanate, a blowing agent, flame retardant and the polymer dispersion of claim 14.

22. A flame retardant polyurethane foam prepared by the reaction of an organic polyisocyanate, a blowing agent, flame retardant and the polymer dispersion of claim 15.

23. A process for preparing a flame retardant polyurethane foam comprising reacting in the presence of a blowing agent, and a flame retardant, an organic polyisocyanate and the graft polymer dispersion of claim 9.

24. A process for preparing a flame retardant polyurethane foam comprising reacting in the presence of a blowing agent, and a flame retardant, an organic polyisocyanate and the graft polymer dispersion of claim 10.

25. A process for preparing a flame retardant polyurethane foam comprising reacting in the presence of a blowing agent, and a flame retardant, an organic polyisocyanate and the graft polymer dispersion of claim 11.

26. A process for preparing a flame retardant polyurethane foam comprising reacting in the presence of a blowing agent, and a flame retardant, an organic polyisocyanate and the graft polymer dispersion of claim 12.

27. A process for preparing a flame retardant polyurethane foam comprising reacting in the presence of a blowing agent, and a flame retardant, an organic polyisocyanate and the graft polymer dispersion of claim 13.

28. A process for preparing a flame retardant polyurethane foam comprising reacting in the presence of a blowing agent, and a flame retardant, an organic polyisocyanate and the graft polymer dispersion of claim 14.

29. A process for preparing a flame retardant polyurethane foam comprising reacting in the presence of a blowing agent, and a flame retardant, an organic polyisocyanate and the graft polymer dispersion of claim 15.

* * * * *